United States Patent
Simmons

(10) Patent No.: US 6,672,022 B2
(45) Date of Patent: Jan. 6, 2004

(54) CABLE TRAY SUPPORT SYSTEM

(76) Inventor: George E. Simmons, 1073 79th St. South, St. Petersburg, FL (US) 33743

( * ) Notice: Subject to any disclaimer, the term of this patent is extended or adjusted under 35 U.S.C. 154(b) by 0 days.

(21) Appl. No.: 09/873,122

(22) Filed: May 31, 2001

(65) Prior Publication Data

US 2002/0003194 A1 Jan. 10, 2002

Related U.S. Application Data

(60) Provisional application No. 60/208,258, filed on May 31, 2000.

(51) Int. Cl.$^7$ .................................................. E04B 5/48
(52) U.S. Cl. ....................... 52/263; 52/220.1; 52/220.5; 52/660
(58) Field of Search ................................ 52/263, 126.4, 52/221, 741, 126.2, 126.3, 126.5, 126.6, 220.1, 220.5, 660; 174/48; 248/49, 68.1

(56) References Cited

U.S. PATENT DOCUMENTS

| | | | |
|---|---|---|---|
| 4,596,095 A | 6/1986 | Chalfant | 52/126.6 |
| 4,630,417 A | 12/1986 | Collier | 52/263 |
| 4,676,036 A | 6/1987 | Bessert | 52/126.6 |
| 4,850,162 A | 7/1989 | Albrecht | 52/126.6 |
| RE33,220 E * | 5/1990 | Collier | 52/263 |
| 5,049,700 A | 9/1991 | Kobayashi et al. | 174/48 |
| 5,100,086 A | 3/1992 | Rinderer | 248/49 |
| 5,389,737 A | 2/1995 | Kobayashi et al. | 174/48 |
| 5,477,649 A | 12/1995 | Bessert | 52/263 |
| 5,546,717 A | 8/1996 | Penczak et al. | 52/220.5 |
| 5,548,932 A | 8/1996 | Mead | 50/126.6 |
| 5,787,663 A * | 8/1998 | Wehrmann | 52/263 |
| 5,791,096 A | 8/1998 | Chen | 52/126.6 |
| 5,839,702 A | 11/1998 | Jette | 248/49 |
| 5,953,870 A | 9/1999 | Jette | 52/220.1 |
| 6,019,323 A | 2/2000 | Jette | 248/49 |
| 6,061,884 A | 5/2000 | Ohmas et al. | 24/703.1 |
| 6,427,400 B1 * | 8/2002 | Greenblatt | 52/220.5 |
| 2002/0014045 A1 * | 2/2002 | Jette | 52/263 |
| 2002/0078638 A1 * | 6/2002 | Huang | 52/126.6 |

FOREIGN PATENT DOCUMENTS

| | | | | |
|---|---|---|---|---|
| DE | 2244596 | * | 3/1974 | 52/126.2 |
| FR | 418167 | * | 9/1990 | 17/48 |
| FR | 2812775 | * | 2/2002 | 52/126.4 |

* cited by examiner

Primary Examiner—Lanna Mai
Assistant Examiner—Phi Dieu Tran A
(74) Attorney, Agent, or Firm—Needle & Rosenberg, PC.

(57) ABSTRACT

A raised floor system which includes a plurality of upright support columns, a plurality of floor panels, and a cable tray support assembly. The cable tray support assembly includes a plurality of support pedestals and a platform section. Each support pedestal has an elongated stringer member, a first upright sleeve member, and a second upright sleeve member. Each first and second sleeve member defines a bore extending from a top end through a bottom end. The stringer member is attached to the sleeve members proximate the respective top ends of the first and second sleeve members so that the elongated stringer member is supported above the respective bottom ends of the first and second sleeve members. At least one of the first and second sleeve members of each first support pedestal is removably connected, in overlying registration, to the body portion of one support column of a pair of support columns. One platform section is suspended from the stringer members of a pair of opposing first support pedestals.

30 Claims, 5 Drawing Sheets

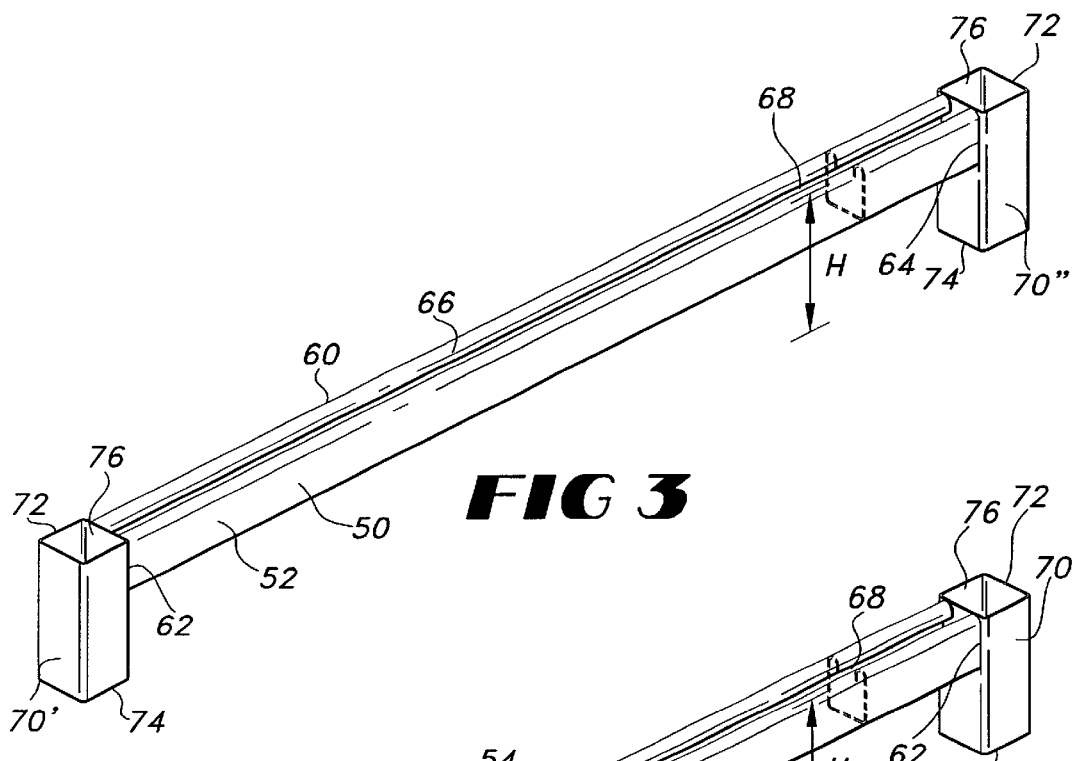
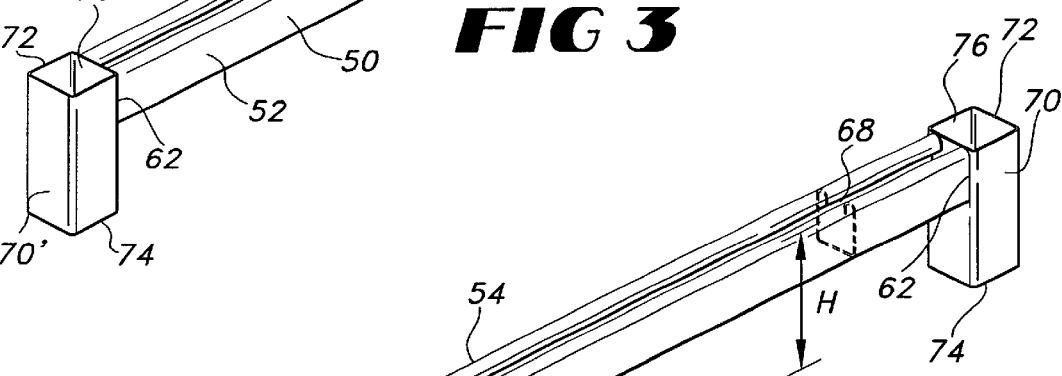
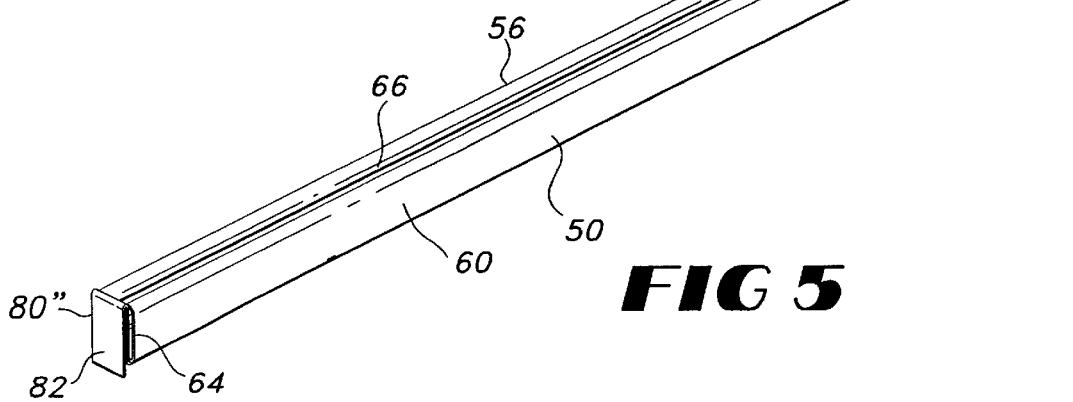

CABLE TRAY SUPPORT SYSTEM

This application claims priority to the U.S. provisional application 60/208,258, filed May 31, 2000, which is incorporated herein in its entirety.

FIELD OF THE INVENTION

The present invention relates to raised floor systems and more particularly to a cable support assembly for use in connection with a raised floor system.

BACKGROUND OF THE INVENTION

Cable trays in general have been used in power stations and large industrial plants for a number of years to support and route various cables through the plants rather than placing these cables inside a conduit. These cable trays are normally supported from a wall or a ceiling at levels which are above a person's head in order to avoid obstructing normal floor space. An alternative to the elevated cable tray has been elevated distribution ducts which are also normally mounted from a wall or a ceiling at elevations so as not to interfere with a person standing on the floor and thus, again, conserve floor space.

In many multi-floor buildings, a current practice is to utilize poured concrete floors. Electrical conductor distribution ducts are normally provided within the poured concrete of these floors in order to provide electrical power distribution to various locations within the building. These electrical power distribution ducts are permanently located within the poured concrete making it impossible to accommodate the rearrangement of equipment as both the use of the floor space changes as well as to accommodate the changes in the equipment due to changes in technology. This has lead to the development of raised floors for certain uses of floor space.

Computer rooms, data processing rooms and electronic equipment rooms, in general, are examples of room uses wherein the overhead wiring distribution approach and/or the power distribution ducts have been partially or totally replaced by the distribution of wires and cables on top of the concrete subfloor and below a removable panel raised floor on which the electrical equipment is placed. These raised floors are normally supported on column assemblies and the area below the raised floor is designed to be utilized as access for the distribution of the various electrical cables.

With the increased complexity of electronic equipment and the increasing number of pieces of equipment being placed in a single room due to the equipment continuously becoming smaller, the interconnection of these pieces of electronic equipment by communication cables and power cables has become more complex. The space between the subfloor and the raised panel floor is somewhat restricted and there may be times when there is moisture on the concrete subfloor such as due to condensation. Cables lying on the concrete subfloor have to remain unaffected by the moisture on the subfloor and these cables also need to avoid the problems associated with entanglement. Cables simply lying on a concrete subfloor can become so entangled that it is difficult to remove one particular cable from the mass of cables on the subfloor should the individual cable need to be changed or rerouted for any reason.

Prior art cable trays have been developed to eliminate some of the problems associated with the routing of cables beneath the raised panel floor. Most prior art cable trays are simply placed on the concrete subfloor. Other cable tray designs are suspended from the structure which supports the removable panels of the raised panel floor. These prior art designs are normally suspended between the raised panel floor and the concrete subfloor and provide an organized route for the various cables to travel in order to interconnect the numerous pieces of electronic equipment placed on the raised panel floor.

While the introduction of these prior art cable trays has significantly reduced the entanglement and moisture problems associated with the concrete subfloors, they are not without their problems. As the number of pieces of electronic equipment being placed in a single room increases so does the number of electrical cables. Consequently the number of electrical cables which are being placed within the prior art cable trays is also increasing. This increasing number of cables in the prior art cable trays can now lead to an entanglement problem within the tray. In addition, when it is desired to have specific cables kept separate from each other, the prior art cable trays are used to route one, or one set of cables, while the second or other set of cables, which need to be kept separate, are routed across the concrete subfloor encountering the problems explained above.

Accordingly, there is a need for a raised floor and cable management system which can accommodate the larger number of cables being routed beneath the raised panel floor as well as providing for the separate routing of specific cables without relying on the subfloor beneath the raised panel floor for routing of cables. Further, there is a continuing need for improved raised floor and cable management systems which require fewer number of components. A need also exists for raised floor and cable management systems which are easier to install than existing systems and which provide increased storage capacity and accessibility.

SUMMARY OF THE INVENTION

The present invention provides a raised floor and cable management system that has lower material and labor costs to install a complete raised floor and cable management system. The present system also encompasses upgrading an existing raised floor system with the presently disclosed cable support assembly.

In one aspect of the present invention, a raised floor system is provided which includes a plurality of upright support columns, a plurality of floor panels, and a cable tray support assembly. The support columns are disposed on a subfloor in a predetermined grid array and are spaced apart from each other a first predetermined distance. Each support column has a shaped body portion. The plurality of floor panels are supported by the support columns.

The cable tray support assembly includes a plurality of first support pedestals and a platform section. Each first support pedestal has an elongated stringer member, a first upright sleeve member, and a second upright sleeve member. Each stringer member preferably has a horizontally disposed surface that defines an open channel extending therein. Each first and second sleeve member defines a bore extending from a top end through a bottom end. The first sleeve member is attached to a proximal end of the stringer member and the second sleeve member is attached to a distal end of the stringer member. By attaching the stringer member proximate the respective top ends of the first and second sleeve members, the elongated stringer member is supported above the respective bottom ends of the first and second sleeve members.

The first and second sleeve members of the first support pedestal may be spaced apart less than or equal to the first predetermined distance. At least one of the first and second sleeve members of each first support pedestal is removably connected, in overlying registration, to the body portion of one support column of a pair of support columns. If the first and second sleeve members of the first support pedestal are spaced apart the first predetermined distance, then the first and second sleeve members of each first support pedestal are removably connected, in overlying registration, to the body portion of two support column of the pair of support columns.

In a second embodiment of the present invention, the cable tray support assembly may also include a second support pedestal having an elongated stringer member, an upright sleeve member, and a hanger member. The elongated stringer member has a horizontally disposed surface that defines an open channel extending therein. The sleeve member is connected to a proximal end of the stringer member and defines a bore that extends from a top end to a bottom end. The hanger member is connected to a distal end of the stringer member and has a terminal hook portion that is oriented downwardly away from the horizontally disposed surface of the stringer member and generally parallel to the distal end of the stringer member. The hanger member of one second support pedestal may be removably connected to a sleeve member of an adjacent first or second support pedestal. The sleeve member of the second support pedestal may be removably connected, in overlying registration, to the body portion of an adjacent support column.

In a third embodiment of the present invention, the cable tray support assembly may include a third support pedestal having an elongated stringer member, a first hanger member, and a second hanger member. The elongated stringer member has a horizontally disposed surface that defines a channel extending therein. The first and second hanger members are connected to the respective proximal and distal ends of the elongated stringer member and each have a terminal hook portion that is oriented downwardly away from the horizontally disposed surface of the stringer member. The terminal hook portions are generally parallel to the respective proximal and distal ends of the stringer member. The first and second hanger members of the third support pedestal may be releasably connected to a pair of first or second sleeve members of a pair of opposing first support pedestals.

Each platform section is configured and dimensioned to support lengths of cable. One platform section is suspended from the stringer members of a pair of opposing support pedestals. The platform section has a proximal edge and an opposed distal edge and at least a portion of the proximal and distal edges of the platform section forms a downwardly extending flange. The flange may be operatively received within the channel of the stringer element.

DETAILED DESCRIPTION OF THE INVENTION

FIG. 3 is a perspective view of a first embodiment of a support pedestal, showing a first support pedestal having a first sleeve member, a second sleeve member, and an elongated stringer member connected to and extending between the first and second sleeve members and showing a cross-sectional view of the stringer member.

FIG. 4 is a perspective view of an alternative embodiment of a support pedestal, showing a second support pedestal having a sleeve member, a hanger member, and an elongated stringer member connected to and extending between the sleeve member and the hanger member and showing a cross-sectional view of the stringer member.

FIG. 5 is a perspective view of an alternative embodiment of a support pedestal, showing a third support pedestal having a first hanger member, a second hanger member, and an elongated stringer member connected to and extending between the first and second hanger members and showing a cross-sectional view of the stringer member.

DETAILED DESCRIPTION OF THE INVENTION

The present invention is more particularly described in the following examples that are intended to be illustrative only since numerous modifications and variations therein will be apparent to those skilled in the art. As used in the specification and in the claims, the singular form "a," "an," and "the" may include plural referents unless the context clearly dictates otherwise.

The present invention provides the art with a raised floor and cable management system which requires many fewer components to assemble thereby resulting in greatly reduced material and labor costs to install a complete raised floor and cable management system. The present invention also encompasses upgrading an existing raised floor system with the presently disclosed cable support assembly.

Figure 1:
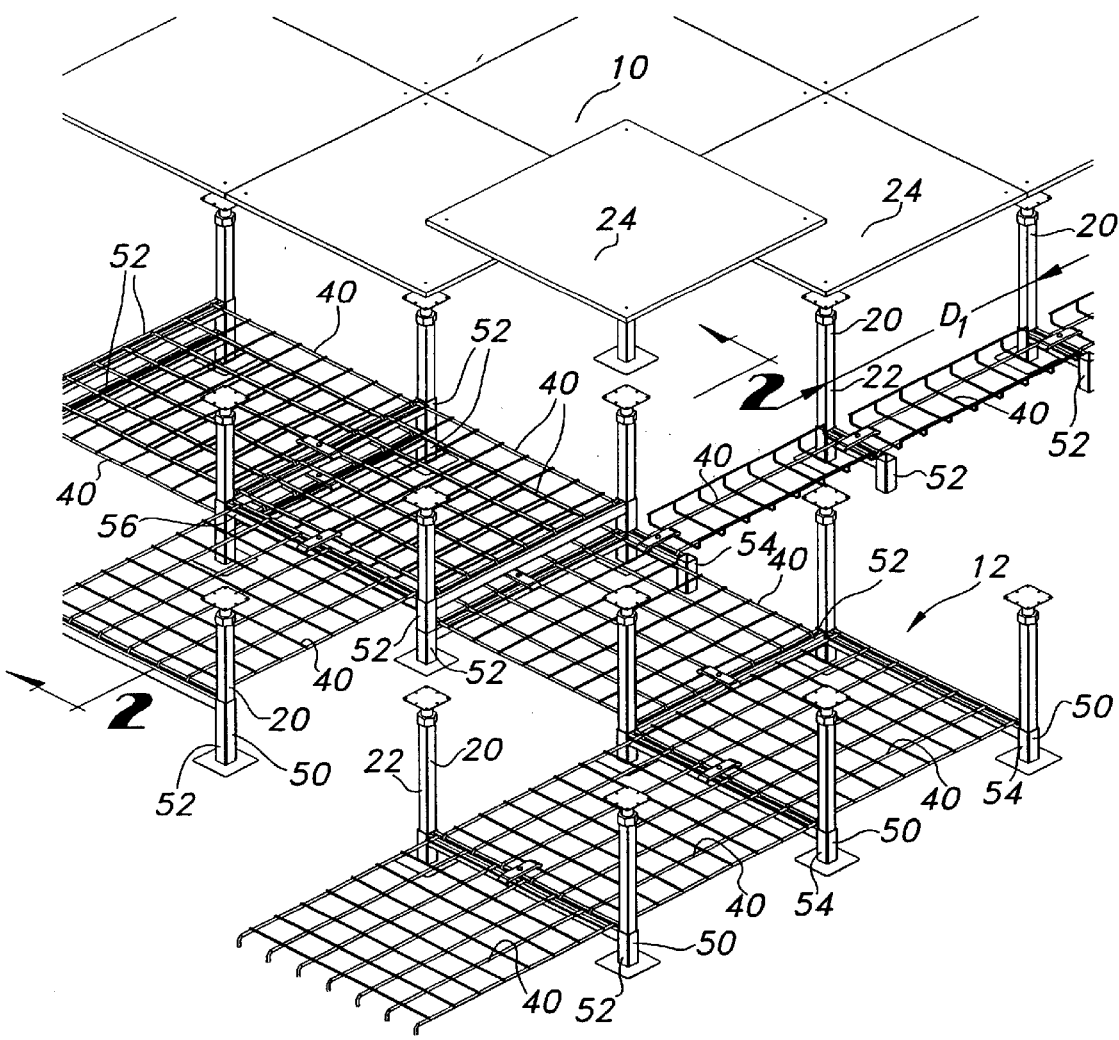
FIG. 1 is a partial perspective view of one embodiment of a raised floor system constructed in accordance with the present disclosure.

Referring now in specific detail to the drawings in which like reference numerals designate like or equivalent elements throughout the several views, and initially to FIG. 1, one embodiment of a raised floor system incorporating a cable tray support assembly of the present invention is designated generally by the reference number 10. The raised floor system 10 is especially adaptable to be used in an electronic equipment room, such as a room containing computer or data processing equipment. The room has a permanent floor or subfloor 12 which may be the usual concrete floor of a typical building. Raised floor assembly 10 is supported above the subfloor 12 at a height which is typically about 12 inches, although this height can be varied.

Generally, the raised floor system 10 includes a plurality of upright support columns 20, a plurality of floor panels 24, and a cable tray support assembly 26. The support columns 20 are disposed in a predetermined grid array on a base such as the subfloor 12. The support columns 20 support the raised floor surface formed from the plurality of floor panels 24. Each support column 20 has a shaped body portion 22. Typically, the support columns 20 are supported by and are usually secured to subfloor 12 in a regular grid pattern of columns and rows. As one will appreciate, when disposed on the subfloor 12, any two adjacent support columns in a row or column of the predetermined grid array forms a pair of support columns that are separated and spaced apart from each other a first predetermined distance $D_1$. Preferably, the first predetermined distance $D_1$ corresponds with the size of the floor panels. However, other grid patterns can be used if desired.

Figure 2:
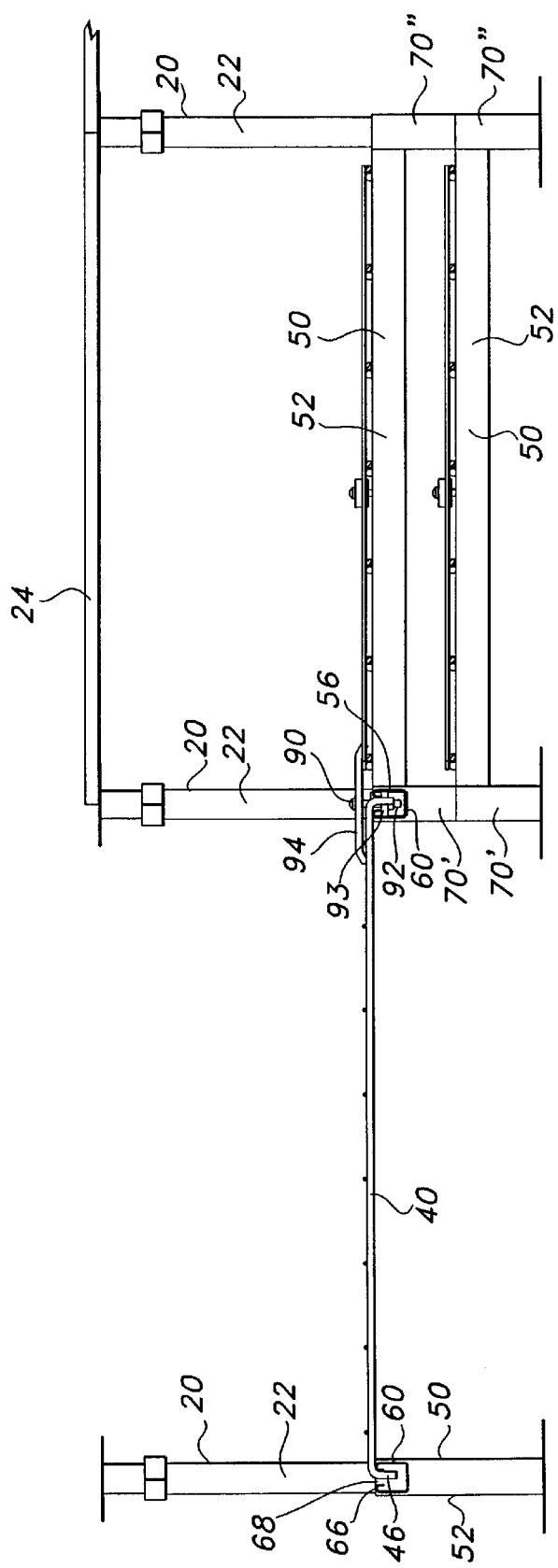
FIG. 2 is a side view of multiple levels of first support pedestals and platform sections installed between the floor panels and a subfloor taken along section 2—2 of FIG. 1.

In one embodiment, the cable tray support assembly 26 includes, as shown in FIGS. 1–3, a plurality of first support pedestals 52 and a platform section 40. By installing a plurality of first support pedestals 52 over a series of columns 20, a pattern of first support pedestals 52 can be assembled to support one or more platform sections 40 along a specific route between subfloor 12 and the upper surface of raised floor assembly 10. Generally, the height of the first support pedestals 52 can be varied to position platform sections 40 at a more convenient level. Further, the width of the first support pedestals 52 can be varied to accommodate platform sections 40 of variable width. In addition, if the need arises to have multiple routes for cables between subfloor 12 and the upper surface of raised floor system 10, a multiple number of first support pedestals 52 can be removably connected on the respective pairs of columns 20 to provide support for a multiple number of platform sections 40 to form multiple levels of platform sections 40 between the subfloor 12 and the floor panels 24. As one will also appreciate, the connection that occurs between the support pedestals 50 and the support columns 20 provides an excellent electrical ground for the cable tray assembly.

Each first support pedestal 52 has an elongated stringer member 60, a first upright sleeve member 70', and a second upright sleeve member 70". The stringer member 60 has a proximal end 62 and an opposed distal end 64. Each stringer member 60 has a horizontally disposed surface 66 that defines an open channel 68 (in cross-section) extending therein. Each sleeve member 70 has a top end 72, a bottom end 74, and defines a bore 76 extending from the top end 72 through the bottom end 74. The first sleeve member 70' is attached to the proximal end 62 of the stringer member 60 and the second sleeve member 70" is attached to the distal end 64 of the stringer member 60.

By attaching the stringer member 60 proximate the respective top ends 72 of the first and second sleeve members 70', 70", the elongated stringer member 60 is supported above the respective bottom ends 74 of the first and second sleeve members 70', 70" at a predetermined height H. As one skilled in the art will appreciate, by varying the length of the first and second sleeve members 70', 70" between the top and bottom ends 72, 74, the predetermined height H of the stringer member 60 relative to the bottom ends 74 of the first support pedestal 52 may be varied. It is contemplated that first support pedestals 52 having varied predetermined heights H may be used in the raised floor system 10. For example, a platform section 40 supported by a first support pedestal 52 having a predetermined height H of, for example, 6 inches, may be operatively connected to a platform section 40 supported by a pair of stacked first support pedestals 50 which each have a predetermined height H of, for example, 3 inches (for a combined height of approximately 6 inches). Further, to accommodate platform sections 40 of variable width, the first and second sleeve members 70', 70" of the first support pedestal 52 may be spaced apart less then or equal to the first predetermined distance $D_1$.

At least one of the first and second sleeve members 70', 70" of each first support pedestal 52 is removably connected, in overlying registration, to the body portion 22 of one support column 20 of a pair of support columns to form one pair of opposing first support pedestals 52. If the first and second sleeve members 70', 70" of the first support pedestal 52 are spaced apart the first predetermined distance $D_1$, then the first and second sleeve members 70', 70" of each first support pedestal 52 are removably connected, in overlying registration, to the body portion 22 of the two support columns 20 forming the pair of support columns.

For example, to assemble a portion of the cable tray assembly 26 of the raised floor system 10, the first and second sleeve members 70', 70" of one first support pedestal 52 may be removably connected to the respective body portions 22 of a first pair of support columns 20 and the first and second sleeve members 70', 70" of an opposing first support pedestal 52 may be removably connected to the respective body portions 22 of a second pair of support columns 20 to form a pair of opposing first support pedestals 52. Alternatively, it is contemplated that, if the width of the first support pedestal 52 is less than the first predetermined distance $D_1$, one of either the first or the second sleeve members 70', 70" of each of the opposing first support pedestals 52 will be removably connected to the body portions 22 of two adjacent support columns 20 to form the pair of opposing first support pedestals. The sleeve member 70 of the first support pedestal 52 that is not connected to the support column 20 may be disposed on and supported by the subfloor 12 or, if multiple levels of the cable tray assembly 26 are being constructed, by the sleeve member 70 of an underlying first support pedestal 52.

Preferably the bore 76 of the sleeve members 70 has a shape that is complementary to the exterior surface shape of the body portion 22 of the support column 20. For example, as shown in FIG. 1, both the body portion 22 of the support column 20 and the bore 76 of the sleeve members 70 are generally rectangular or square in cross-section. It is contemplated that any complementary cross-sectional shape made be used for the bore 76 and the body portion 22, such as, for example, a rectangular shape, a circular shape, a triangular shape, a keyed shape, and the like. As one will appreciate, having complementary shapes for the bore 76 of the sleeve members 70 and the body portion 22 of the support columns 20 allows for quick and orderly orientation of the individual support pedestals 50 relative to the connected support columns 20 which decreases labor costs because the installation may be completed in less time. However, there is no requirement that the bore 76 of the sleeve members 70 and the body portion 22 of the support columns 20 have a complementary shape, i.e., for example the body portion 22 could have a circular cross-section and the bore 76 could have a square cross-section. It is only necessary for the bore 76 of the sleeve member 70 to be able to be placed into removable overlying registration with the body portion 22 of the support column 20.

Alternatively, the cable tray support assembly 26 may also include a second embodiment of a support pedestal 50 which is shown in FIGS. 1 and 4. The construction of the second support pedestal 54 is similar to the first support pedestal 52 and, accordingly, the figures use the same reference number for similar components. Furthermore, the components in FIGS. 1–4 that use the same reference numbers are substantially equivalent and the description thereof is omitted for the second embodiment.

In the second embodiment, the cable tray assembly may include a second support pedestal 54 having an elongated stringer member 60, an upright sleeve member 70, and a hanger member 80. The sleeve member 70 is connected to a proximal end 62 of the stringer member 60 and defines a bore 76 that extends from a top end 72 to a bottom end 74 of the sleeve member 70. The hanger member 80 is connected to a distal end 64 of the stringer member 60 and has a terminal hook portion 82 that is oriented downwardly away from the horizontally disposed surface 66 of the stringer member 60 and generally parallel to the distal end 64 of the stringer member 60. In cross-section, the terminal hook portion 82 has an inverted "U" shape when inserted for engagement with a sleeve member 70 as discussed below.

In use, the hanger member 80 of one second support pedestal 54 may be removably connected to a sleeve member 70 of an adjacent first or second support pedestal 52, 54. As one will appreciate, when the terminal hook portion 82 of the hanger member 80 is connected to the sleeve member 70 of the respective first or second support pedestal 52, 54, the elongated stringer members 60 of the joined support pedestals 50 are substantially co-planar. Similar to the first support pedestal 52, the height of the second support pedestal 54 relative to the bottom end 74 of the sleeve member 70 can be varied by varying the longitudinal length of the sleeve member 70 to position platform sections 40 at a more convenient level. Further, the width of the second support pedestal 54 can be varied to accommodate platform sections 40 of variable width.

For example, if the hanger member 80 and the sleeve member 70 of the second support pedestal 54 are spaced apart the first predetermined distance $D_1$, then the sleeve member 70 of the second support pedestal 54 is removably connected, in overlying registration, to the body portion 22 of one of two support columns 20 forming a pair of support columns and the terminal hook portion 82 of the hanger member 80 is removably connected to the sleeve member 70 of the other support column 20 of the pair of support columns. Alternatively, it is contemplated that, if the width of the second support pedestal 54 is less than the first predetermined distance D1, the sleeve member 70 of the second support pedestal 54 will be disposed on and supported by the subfloor 12 or, if multiple levels of the cable tray assembly 26 are being constructed and the predetermined height of the second support pedestal 54 is not sufficient to place the stringer members 60 of the connected support pedestals in co-planar relationship, by the sleeve member 70 of an underlying second support pedestal 54.

Alternatively, the cable tray support assembly 26 may also include a third embodiment of a support pedestal 50 which is shown in FIGS. 1 and 5. The construction of the third support pedestal 56 is similar to the first and second support pedestals 52, 54 and, accordingly, the figures use the same reference number for similar components. Furthermore, the components in FIGS. 1–5 that use the same reference numbers are substantially equivalent and the description thereof is omitted for the third embodiment.

In the third embodiment, the cable tray assembly 26 may include third support pedestal 56 having an elongated stringer member 60, a first hanger member 80', and a second hanger member 80". The first hanger member 80' is connected to a proximal end 62 of the stringer member 60 and the second hanger member 80" is connected to a distal end 64 of the stringer member 60. As noted above, each hanger member 80', 80" has a terminal hook portion 82 that is oriented downwardly away from the horizontally disposed surface 66 of the stringer member 60 and generally parallel to the respective proximal and distal ends 62, 64 of the stringer member 60. 20

In use, the first and second hanger members 80', 80" of one third support pedestal 56 may be removably connected to an opposing pair of sleeve members 70 of a pair of opposing support pedestals 50, such as a pair of opposing first support pedestals 52, a pair of opposing second support pedestals 54, or a pair formed from an opposing first and a second support pedestals 52, 54. For example, the first and second hanger members 80', 80" of one third support pedestal 56 may be removably connected to an opposing pair of first sleeve members 70' of a pair of opposing first support pedestals 52, an opposing pair of second sleeve members 70" of a pair of opposing first support pedestals 52, an opposing pair of sleeve members 70 of a pair of opposing second support pedestals 54, or an opposing pair of sleeve members 70 formed from either a first or second sleeve member 70', 70" of a first support pedestal 52 and a sleeve member 70 of a second support pedestal 54. When connected to the respective opposing sleeve members 70, the elongated stringer member 60 of the third support pedestal 56 is substantially co-planar with the stringer members 60 of the two adjoining support pedestals 50.

It will be appreciated that the described system provides significant savings in material costs and installation labor costs in comparison with prior art cable tray systems which require the cable tray assembly to be mechanically fastened to the every "connected" column.

Figure 6:
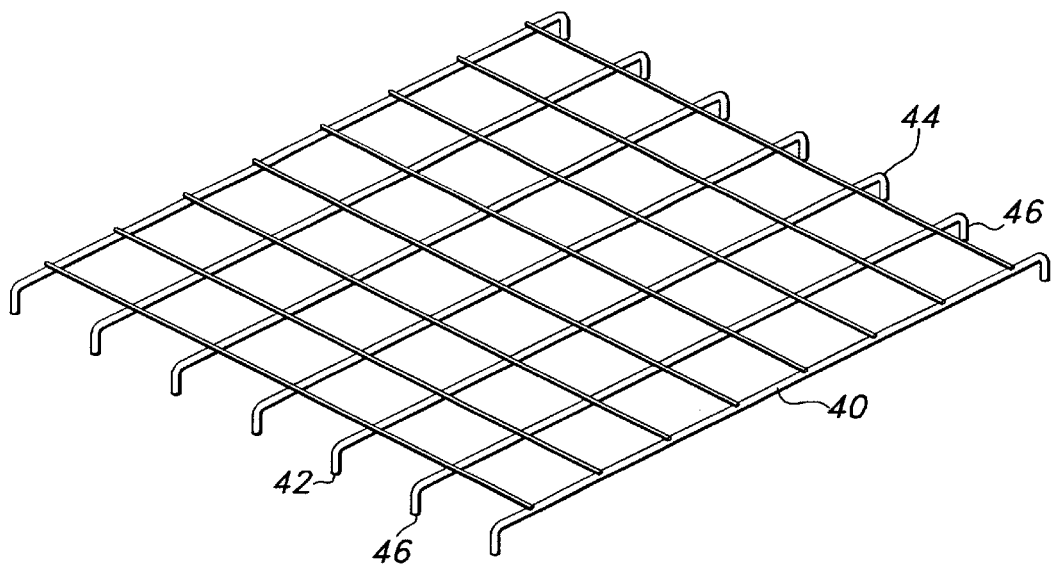
FIG. 6 is a perspective view of a first embodiment of a platform section.
Figure 7:
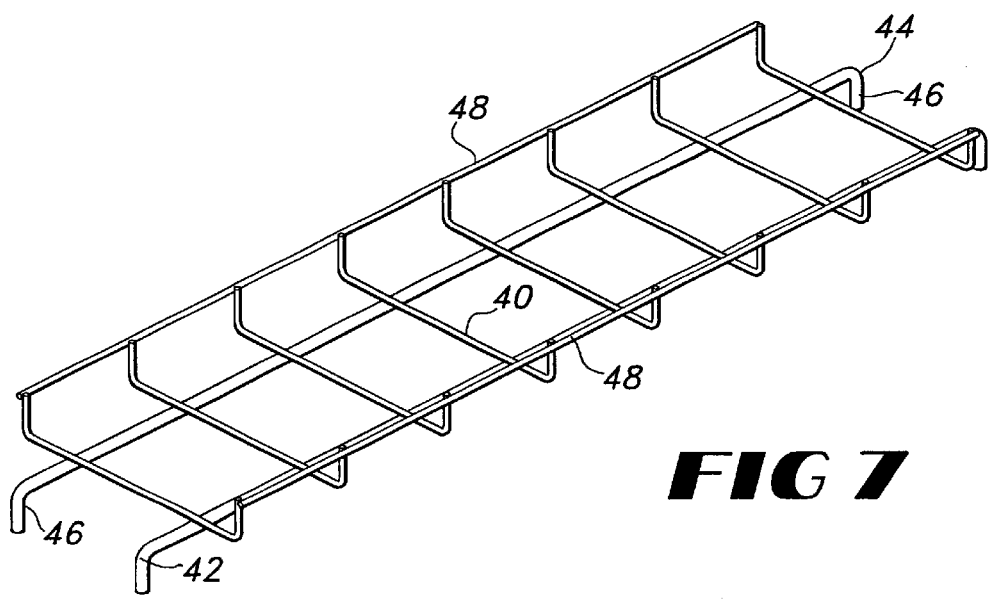
FIG. 7 is a perspective view of a second embodiment of a platform section.

Referring to FIGS. 1, 6, and 7, each platform section 40 is configured and dimensioned to support lengths of cable. One of the platform sections 40 is suspended from the stringer members 60 of a pair of opposing support pedestals 50, such as, for example, an opposing pair of first support pedestals 52, an opposing pair of first and second support pedestals 52, 54, and/or an opposing pair of first and third support pedestals 52, 56. The platform section 40 has a proximal edge 42 and an opposed distal edge 44 and at least a portion of the proximal and distal edges 42, 44 of the platform section 40 forms a downwardly extending flange 46. At least a portion of the flange 46 may be operatively received within the open channel 68 of the stringer element 60. The platform sections 40 may also have a upwardly extending lip 48 extending along each longitudinal edge to provide for retention of the cable bundles supported by the platform section 40.

Although the illustrated platform sections 40 are formed of a wire stock material, it is within the scope of the present disclosure to use other materials as well. For example, the platform section 40 may be formed of solid or woven fabrications of various metals, polymers, or any other material suitable for support cable bundles and runs thereon.

Figure 8:
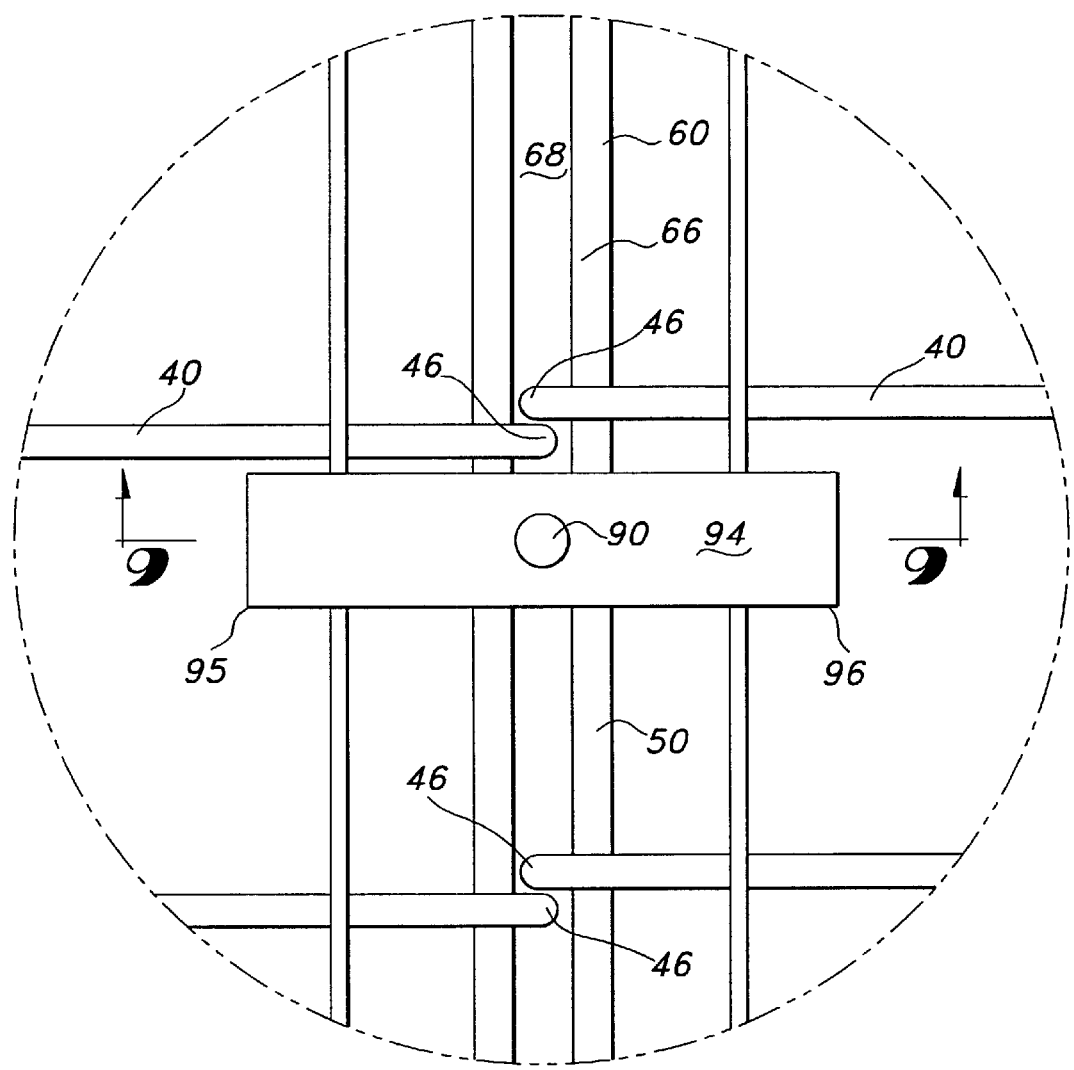
FIG. 8 is a partial top view of a portion of two adjacent platform sections secured to a channel extending therein the stringer member of a support pedestal.
Figure 9:
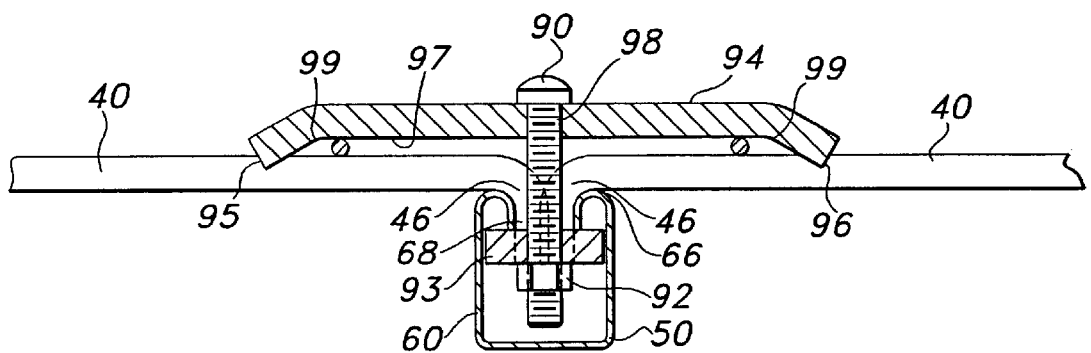
FIG. 9 is a cross-sectional side view taken along section line 9—9 of FIG. 8.

Referring now to FIGS. 1, 8, and 9, the open channel 68 of the stringer member 60 of a support pedestal 50 may be in operative receipt of portions of the downwardly extending flanges 46 of two adjoining platform sections 40. For securing portions of the two adjoining platform sections 40 to the stringer element 60, the cable tray support assembly may include a securing means. For example, the securing means may comprise a bolt 90, a nut 92, a washer 93, and an elongated clamp bar 94. The bolt 90 and the nut 92 are conventional and have complementary threaded surfaces so that they may be removably secured to each other. The clamp bar 94 has a first end 95, a opposing second end 96, and a mating surface 97 extending between the first end 95 and the second end 96. The clamp bar 94 further defines a hole 98 generally intermediate the first and second ends 95, 96 that extends traversally through the clamp bar 94. The clamp bar 94 may extend downwardly away as it approaches the first and second ends 95, 96 of the bar 94 so that the mating surface 97 has a bent portion 99 proximate each of the first and second ends 95, 96 (the clamp bar 94 thus having a slight U-shape in cross-section). The nut 92 and washer 93 are sized to fit within the interior of the stringer element 60 and at least the washer 93 is larger than the width of the open channel 68 of the stringer element 60. In use, the clamp bar 94 is placed over portions of the upper surface of the two adjoining platform sections 40, the bolt 90 is inserted through the hole 98 of clamp bar 94 and into operative connection with the complementary washer 93 and nut 92 to draw the mating surface 97 of the clamp bar 94 into operative connection with the two platform sections 40. If the platform sections 40 are made from wire stock, the clamp bar 94 is sized so that the bent portions 99 of the clamp bar 94 may grasp individual strands of wire stock in the adjoining platform sections 40.

In certain installations it may be desirable or necessary to install the cable support assembly 26 as a stand-alone modular assembly. It is within the scope of the present disclosure that in such an installation invention that the support columns 20 are independent stanchions or other suitable supports which are not also used to support the floor system (i.e., are not used to support the floor panels 24).

Referring to FIGS. 1 and 2, multiple levels of platform sections 40 may be constructed using the cable support assembly 26 outlined above. The multiple levels are placed between the subfloor 12 and the floor panels 24. While it is understood that various combinations of first, second, and third support pedestals 52, 54, 56 may be used depending upon the orientation of the desired pattern of the platform sections 40.

In the following example, a plurality of support pedestals 50 are provided for an exemplary construction of multiple levels of the present invention, in which each support pedestal 50 has a first upright sleeve member 70', a second upright sleeve member 70", and an elongated stringer member 60 (i.e., the support pedestal 50 for this example has the structure of the first support pedestal 52 as described above). Initially, the first sleeve member 70' and the second sleeve member 70" of a first support pedestal 50 are placed in overlying registration with the body portions 22 of a first pair of support columns 20 and the first sleeve member 70' and the second sleeve member 70" of a second support pedestal 50 in overlying registration with the body portions 22 of a second pair of support columns 20. Here, the second pair of support columns 20 are opposed to the first pair of support columns 20 to form a first pair of opposing support pedestals 50. Next, a first platform section 40 is suspended from the stringer members 60 of the first pair of opposing support pedestals 50.

The first sleeve member 70' and the second sleeve member 70" of a third support pedestal 50 may be placed in overlying registration with the body portions 22 of a third pair of support columns 20, the third pair of support columns 20 opposed to the second pair of support columns 20, to form a second pair of opposing support pedestals 50. A second platform section 40 may be suspended from the stringer members 60 of the second pair of opposing support pedestals 50 so that a portion of the first and second platform sections 40 are adjoined. If desired, a portion of the adjoined first and second platform sections 40 may be secured to the stringer element 60 of one support pedestal 50.

To form a level above the first platform section 40, the first sleeve member 70' and the second sleeve member 70" of a fourth support pedestal 50 are placed in overlying registration with the body portions 22 of the first pair of support columns 20 so that the bottom ends 74 of the first and second sleeve members 70', 70" of the fourth support pedestal 50 are in contact with the top ends 72 of the first and second sleeve members 70', 70" of the first support pedestal 50. Similarly, the first sleeve member 70' and the second sleeve member 70" of a fifth support pedestal 50 are placed in overlying registration with the body portions 22 of the second pair of support columns 20 so that the bottom ends 74 of the first and second sleeve members 70', 70" of the fifth support pedestal 50 are in contact with the top ends 72 of the first and second sleeve members 70', 70" of the second support pedestal 50. Thus, the fourth and fifth support pedestals 50 form a third pair of opposing support pedestals 50 from which a third platform section 40 may be suspended. In this fashion, the third platform section 40 is spaced apart from and suspended above the first platform section 40 to form a second level intermediate the subfloor 12 and the floor panels 24.

Although the illustrative embodiments of the present disclosure have been described herein with reference to the accompanying drawings, it is to be understood that the disclosure is not limited to those precise embodiment, and the various other changes and modifications may be affected therein by one skilled in the art without departing from the scope of spirt of the disclosure. All such changes and modifications are intended to be included within the scope of the disclosure as defined by the appended claims.

What is claimed is:

1. A raised floor system, comprising:

a) a plurality of upright support columns oriented in a predetermined grid array, the support columns spaced apart from each other a first predetermined distance, each support column having a body portion;

b) a plurality of floor panels supported by the support columns; and c) a cable tray support assembly which comprises:

i) a plurality of support pedestals, the plurality of support pedestals including at least one first support pedestal and at least one second support pedestal, each respective first and second support pedestal having an elongated stringer member having a proximal end and an opposed distal end, the first support pedestal further comprising a first upright sleeve member and a second upright sleeve member, each first and second sleeve member having a top end, an opposed bottom end, and defining a bore that extends from the top end to the bottom end, the first sleeve member of the first support pedestal being connected to the proximal end of the stringer member and the second sleeve member of the first support pedestal being connected to the distal end of the stringer member so that the elongated stringer member is supported above the bottom ends of the first and second sleeve members of the first support pedestal, the second support pedestal further comprising the first sleeve member and a hanger member, the hanger member having a terminal hook portion, the first sleeve member of the second support pedestal being connected to the proximal end of the stringer member and the hanger member being connected to the distal end of the stringer member so that the terminal hook portion of the hanger member is oriented downwardly away from the horizontally disposed surface of the stringer member and generally parallel to the distal end of the stringer member, wherein the hanger member of the second support pedestal is constructed and arranged for removable connection to one of the first or second sleeve members of the first support pedestal; and ii) a platform section suspended from the stringer members of a pair of opposing first support pedestals, the platform section being configured and dimensioned to support lengths of cable thereon;

wherein the stringer element of the support pedestals has a horizontally disposed surface that defines a channel extending therein, wherein the platform section has a proximal edge and an opposed distal edge, at least a portion of the proximal and distal edges forming a downwardly extending flange, wherein the downwardly extending flange of the platform section is received within the channel of the stringer element, wherein the respective bores of the first and second sleeve members of one first support pedestal axe removably positioned, in overlying registration, to the respective body portions of a first pair of support columns, and wherein the respective bores of the first and second sleeve members of the opposing first support pedestal of the pair of first support pedestals, are removably positioned, in overlying registration, to the respective body portions of a second pair of support columns.

2. The raised floor system of claim 1, wherein the bore of the respective first and second sleeve members has a shape that is complementary to the body portion of the support column.

3. The raised floor system of claim 1, wherein the channel is in operative receipt of portions of two adjoining platform sections, further comprising securing means for securing portions of the two adjoining platform sections to the stringer element.

4. The raised floor system of claim 1, wherein the first and second sleeve members are spaced apart less than the first predetermined distance and wherein one of the first or second sleeve members of one first support pedestal is disposed thereon a subfloor.

5. The raised floor system of claim 1, wherein multiple levels of first support pedestals and platform sections are installed between a subfloor and the floor panels.

6. The raised floor system of claim 1, wherein the bore of the sleeve member has a shape complementary to the body portion of the support column.

7. The raised floor system of claim 1, wherein one platform section is suspended from the stringer members of a pair of opposing first and second support pedestals.

8. The raised floor system of claim 1, wherein the sleeve member and hanger member of the second support pedestal are spaced apart less than the first predetermined distance and wherein the sleeve member of the second support pedestal is disposed thereon the subfloor.

9. The raised floor system of claim 1, wherein the bore of the sleeve member of the second support pedestal is removably positioned, in overlying registration, to the body portion of an adjacent support column.

10. The raised floor system of claim 1, wherein the plurality of support pedestals further includes a third support pedestal having a first hanger member and a second hanger member, each of the first and second hanger members having a terminal hook portion, the first hanger member connected to the distal end of the stringer member and the second hanger member connected to the proximal end of the stringer member so that the terminal portions of the first and second hanger members are oriented downwardly away from the horizontally disposed surface of to stringer member and generally parallel to the respective distal and proximal ends of the stringer member, wherein the first and second hanger members of the third support pedestal are releasably connected to a pair of first sleeve members or a pair of second sleeve members of the pair of opposing first support pedestals.

11. The raised floor system of claim 10, wherein one platform section is suspended from the stringer members of a pair of opposing first and third support pedestals.

12. The raised floor system of claims 1, wherein the platform section is formed of wire stock.

13. A modular cable support assembly, comprising:
a) a plurality of upright support columns, the support columns spaced apart from each other a first predetermined distance, each support column having a body portion;

b) a plurality of support pedestals, the plurality of support pedestals including at least one first support pedestal and at least one second support pedestal, each respective first and second support pedestal having an elongated stringer member having a proximal end and an opposed distal end, the first support pedestal further comprising a first upright sleeve member and a second upright sleeve member, each first and second sleeve member having a top end, an opposed bottom end, and defining a bore that extends from the top end to the bottom end, the first sleeve member of the first support pedestal being connected to the proximal end of the stringer member and the second sleeve member of the first support pedestal being connected to the distal end of the stringer member so that the elongated stringer member is supported above the bottom ends of the first and second sleeve members of the first support pedestal, the second support pedestal further comprising the first sleeve member and a hanger member, the hanger member having a terminal hook portion, the first sleeve member of the second support pedestal being connected to the proximal end of the stringer member and the hanger member being connected to the distal end of the stringer member so that the terminal hook portion of the hanger member is oriented downwardly away from the horizontally disposed surface of the stringer member and generally parallel to the distal end of the stringer member, wherein the hanger member of the second support pedestal is constructed and arranged for removable connection to one of the first or second sleeve members of the first support pedestal; and c) a platform section suspended from the stringer members of a pair of opposing first support pedestals, the platform section being configured and dimensioned to support lengths of cable thereon;

wherein the stringer element of the support pedestals has a horizontally disposed surface that defines a channel extending therein, wherein the platform section has a proximal edge and an opposed distal edge, at least a portion of the proximal and distal edges forming a downwardly extending flange, wherein the downwardly extending flange of the platform section is received within the channel of the stringer element, wherein the respective bores of the first and second sleeve members of one first support pedestal are removably positioned, in overlying registration, to the respective body portions of a first pair of support columns, and wherein the respective bores of the first and second sleeve members of the opposing first support pedestal of the pair of first support pedestals, are removably positioned, in overlying registration, to the respective body portions of a second pair of support columns.

14. The modular cable support assembly of claim 13, wherein the bore of the respective first and second sleeve members has a shape complementary to the body portion of the support column.

15. The modular cable support assembly of claim 13, wherein the channel is in operative receipt of portions of two adjoining platform sections, further comprising securing means for securing portions of the two adjoining platform sections to the stringer element.

16. The modular cable support assembly of claim 13, wherein the first and second sleeve members are spaced apart less than the first predetermined distance and wherein one of the first or second sleeve members of one first support pedestal is disposed thereon a subfloor.

17. The modular cable support assembly of claim 13, wherein multiple levels of first support pedestals and platform sections can be installed between a subfloor and the floor panels.

18. The modular cable support assembly of claim 13, wherein the bore of the sleeve member has a shape complementary to the body portion of the support column.

19. The modular cable support assembly of claim 13, wherein one platform section is suspended from the stringer members of a pair of opposing first and second support pedestals.

20. The modular cable support assembly of claim 13, wherein the sleeve member and hanger member of the second support pedestal are spaced a art less than the first predetermined distance and wherein the sleeve member of the second support pedestal is disposed thereon a subfloor.

21. The modular cable support assembly of claim 13, wherein the bore of the sleeve member of the second support pedestal is removably positioned, in overlying registration, to the body portion of an adjacent support column.

22. The modular cable support assembly of claim 13, wherein the plurality of support pedestals includes a third support pedestal having a first hanger member and a second hanger member, each of the first and second hanger members having a terminal hook portion, the first hanger member connected to the distal end of the stringer member and the second hanger member connected to the proximal end of the stringer member so that the terminal portions of the first and second hanger members are oriented downwardly away from the horizontally disposed surface of the stringer member and generally parallel to the respective distal and proximal ends of the stinger member, wherein the first and second hanger members of the third support pedestal are releasably connected to a pair of first sleeve members or a pair of second sleeve members of the pair of opposing first support pedestals.

23. The modular cable support assembly of claim 22, wherein one platform section is suspended from the stringer members of a pair of opposing first and third support pedestals.

24. The modular cable support assembly of claims 13, wherein the platform section is formed of wire stock.

25. A method of assembling a raised floor system comprising: disposing a series of support columns in a predetermined grid array onto a subfloor, each support column having a body portion;

providing a plurality of support pedestals, each support pedestal having an elongated stringer member, a first upright sleeve member, and a second upright sleeve member, the stringer member having a proximal end and an opposed distal end, each of the first and second sleeve members having a top end, an opposed bottom end, and defining a bore that extends from the top end to the bottom end, wherein the first sleeve member is connected to the proximal end of the stringer member and the second sleeve member is connected to the distal end of the stringer member so that the elongated stringer member is supported above the bottom ends of the first and second sleeve members;

placing the respective bores of the first sleeve member and the second sleeve member of a first support pedestal in overlying registration with the body portions of a first pair of support columns;

placing the respective bores of the first sleeve member and the second sleeve member of a second support pedestal in overlying registration with the body portions of a second pair of support columns, the second pair of support columns opposed to the first pair of support columns, to form a first pair of opposing support pedestals;

suspending a first platform section from the stringer members of the first pair of opposing support pedestals, the platform section being configured and dimensioned to support lengths of cable thereon;

placing the respective bores of the first sleeve member and the second sleeve member of a third support pedestal in overlying registration with the body portions of a third pair of support columns, the third pair of support columns opposed to the second pair of support columns, to form a second nut of opposing support pedestals;

suspending a second platform section from the stringer members of the second pair of opposing support pedestals, wherein a portion of the first and second platform sections are adjoined;

placing the respective bores of the first sleeve member and the second sleeve member of a fourth support pedestal in overlying registration wit the body portions of the first pair of support columns so that the bottom ends of the first and second sleeve members of the fourth support pedestal are in contact with the top ends of the first and second sleeve members of the first support pedestal;

placing the respective bores of the first sleeve member and the second sleeve member of a fifth support pedestal in overlying registration with the body portions of the second pair of support columns so that the bottom ends of the first and second sleeve members of the fifth support pedestal are in contact with the top ends of the first and second sleeve members of the second support pedestal, the fourth and fifth support pedestals forming a third pair of opposing support pedestals; and suspending a third platform section from the stringer members of the third pair of opposing support pedestals, the third platform section spaced apart from and suspended above the first platform section.

26. The method of claim 25, further comprising securing a portion of the adjoined first and second platform sections to the stringer element of one support pedestal.

27. The method of claim 25, further comprising supporting a plurality of floor panels on the series of support series.

28. The of claim 25, wherein the bore of the respective first and second sleeve members has a shape complementary to the body portion of the support column.

29. A raised floor system, comprising:
a) a plurality of upright support columns oriented in a predetermined grid array, the support columns spaced apart from each other a first predetermined distance, each support column having a body portion;
b) a plurality of floor panels supported by the support columns; and
c) a cable tray support assembly which comprises:
i) a plurality of support pedestals, the plurality of support pedestals including at least one first support pedestal and at least one third support pedestal, each respective first and third support pedestal having an elongated stringer member, the stringer member having a proximal end and an opposed distal end, the first support pedestal further comprising a first upright sleeve member and a second upright sleeve member, each sleeve member having a top end, an opposed bottom end, and defining a bore that extends from the top end to the bottom end, the first sleeve member of the first support pedestal being connected to the proximal end of the stringer member and the second sleeve member of the first support pedestal being connected to the distal end of the stringer member so that the elongated stringer member is supported above the bottom ends of the first and second sleeve members of the first support pedestal, the third support pedestal further comprising a first hanger member and a second hanger member, each respective first and second hanger member having a terminal hook portion, the first hanger member connected to the distal end of the stringer member and the second hanger member connected to the proximal end of the stringer member so that the terminal portions of the first and second hanger members are oriented downwardly away from the horizontally disposed surface of the stringer member and generally parallel to the respective distal and proximal ends of the stringer member, wherein the first and second hanger members of the third support pedestal are constructed and arranged for releasable connection to a pair of first sleeve members or a pair of second sleeve members of a pair of opposing first support pedestals; and ii) a platform section suspended from the stringer members of the pair of opposing first support pedestals, the platform section being configured and dimensioned to support lengths of cable thereon, wherein the stringer element of the support pedestals has a horizontally disposed surface that defines a channel extending therein, wherein the platform section has a proximal edge and an opposed distal edge, at least a portion of the proximal and distal edges forming a downwardly extending flange, wherein the downwardly extending flange of the platform section is received within the channel of the stringer element, wherein the respective bores of the first and second sleeve members of one first support pedestal are removably positioned, in overlying registration, to the respective body portions of a first pair of support columns, and wherein the respective bores of the first and second sleeve members of the opposing first support pedestal of the pair of first support pedestals, are removably positioned, in overlying registration, to the respective body portions of a second pair of support columns.

30. A modular cable support assembly, comprising:

a) a plurality of upright support columns, the support columns spaced apart from each other a first predetermined distance, each support column having a body portion;

b) a plurality of support pedestals, the plurality of support pedestals including at least one first support pedestal and at least one third support pedestal, each respective first and third support pedestal having an elongated stringer member, the stringer member having a proximal end and an opposed distal end, the first support pedestal further comprising a first upright sleeve member and a second upright sleeve member, each sleeve member having a top end, an opposed bottom end, and defining a bore that extends from the top end to the bottom end, the first sleeve member of the first support pedestal being connected to the proximal end of the stringer member and the second sleeve member of the first support pedestal being connected to the distal end of the stringer member so that the elongated stringer member is supported above the bottom ends of the first and second sleeve members of the first support pedestal, the third support pedestal further comprising a first hanger member and a second hanger member, each respective first and second hanger member having a terminal book portion, the first hanger member connected to the distal end of the stringer member and the second hanger member connected to the proximal end of the stringer member so that the terminal portions of the first and second hanger members are oriented downwardly away from the horizontally disposed surface of the stringer member and generally parallel to the respective distal and proximal ends of the stringer member, wherein the first and second hanger members of the third support pedestal are constructed and arranged for releasable connection to a pair of first sleeve members or a pair of second sleeve members of a pair of opposing first support pedestals; and c) a platform section suspended from the stringer members of the pair of opposing first support pedestals, the platform section being configured and dimensioned to support lengths of cable thereon, wherein the stringer element of the support pedestals has a horizontally disposed surface that defines a channel extending therein, wherein the platform section has a proximal edge and an opposed distal edge, at least a portion of the proximal and distal edges forming a downwardly extending flange, wherein the downwardly extending flange of the platform section is received within the channel of the stringer element, wherein the respective bores of the first and second sleeve members of one first support pedestal are removably positioned, in overlying registration, to the respective body portions of a first pair of support columns, and wherein the respective bores of the first and second sleeve members of the opposing first support pedestal of the pair of first support pedestals, are removably positioned, in overlying registration, to the respective body portions of a second pair of support columns.

* * * * *